United States Patent [19]

Maestri et al.

[11] Patent Number: 5,504,168

[45] Date of Patent: Apr. 2, 1996

[54] PROCESS FOR SHORTSTOPPING EMULSION POLYMERIZATIONS WHICH DOES NOT GENERATE NITROSAMINES

[75] Inventors: Piero Maestri, Forlinpopoli; Angelo L. Presti, Medicina, both of Italy

[73] Assignee: Enichem Elastomeri S.r.l., Milano, Italy

[21] Appl. No.: 339,228

[22] Filed: Nov. 10, 1994

[30] Foreign Application Priority Data

Dec. 3, 1993 [IT] Italy ................ MI93 A2539

[51] Int. Cl.$^6$ ............................................ C08F 2/38
[52] U.S. Cl. ................................................ 526/83; 526/85
[58] Field of Search ............................ 526/83, 85

[56] References Cited

U.S. PATENT DOCUMENTS 5,177,164  1/1993  De Vries et al. ................... 526/85
5,384,372  1/1995  Lattime ............................. 526/83

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

Method for the shortstopping of polymerizations of conjugated dienes possibly mixed with vinyl-substituted aromatic products in a radicalic emulsion polymerization process using a redox initiator, in particular radicalic emulsion polymerizations of butadiene possibly mixed with styrene or acrylonitrile, a method which enables the production of polymers without nitrosamines (NA) and/or their precursors.

7 Claims, No Drawings

PROCESS FOR SHORTSTOPPING EMULSION POLYMERIZATIONS WHICH DOES NOT GENERATE NITROSAMINES

The present invention relates to a method for obtaining the shortstopping of polymerizations of conjugated dienes possibly mixed with vinyl-substituted aromatic products in a radicalic emulsion polymerization process using a redox initiator. This method enables the production of polymers without nitrosamines (NA) and/or their precursors. In particular this invention relates to the radicalic emulsion polymerization of butadiene possibly mixed with styrene or acrylonitrile with the use of a shortstopping agent so that the polymers produced have no nitrosamines (NA) and/or their precursors.

The presence of nitrosamines in rubber products is well-known (Kautschuk and gummi Kunststoffe 42, pages 16–21, no.1, 1989. B. Spiegelhalder and co., 7th Inter. Meeting on analysis and formation of N-Nitroso Compounds; Tokyo; Sep. 20–Oct. 1, 1981). Their origin is the result of chemical interactions which occur during the vulcanization phase of rubber. In particular nitrosamines are obtained from dialkylamines (or precursors) by reaction with nitration agents. Dialkylamines may already be contained in the rubber or released by additives used for the vulcanization of the mixtures. It has been shown [J. M. Fajen and co.; Science, N.Y. 205, 1262 (1979), R. Preussman and co. Am. Chem. Soc. Symp. Ser. 174, 217 (1981)]that the nitrosamines thus formed can be released from the end-product:

- into the air in the working environment during production and then inhaled;
- into food or saliva (eg. baby feeding-bottle) and then swallowed.

It is known in literature [P. N. Magee and J. M. Barnes; Adv. Cancer Res. 10, 163 (1967). H. Druckey; Xenobiotica 3, 271 no.5 (1973)]that most probably it is not the nitrosamines themselves that are carcinogenous but their metabolites resulting from the enzymatic hydrolysis in organisms.

The health organizations of various countries have taken the problem in hand and legislative regulations have already been made concerning the presence of nitrosamines and their precursors in Germany [Technische Regaln fuer Gefahrstoffe (TRGS 552); Bundesarbeitblatt 9, 81 (1988)] and in the United States (Federal Register, vol. 49, no.252, Dec.1984). German legislation in particular (see above) has provided for measurements of the NA level in the air of working environments (max. limit allowed 2.5 micrograms/$m^3$) and defined a list of 12 N-nitrosamines classified as cancerogenous substances group (A2), i.e. substances which at present have proved to be cancerogenous in experiments on animals. However in the law on dangerous substances Gefahrstoffverordnung of 26.8. 1986 these NA are in group I, i.e. of more dangerous substances.

On a European scale there is also an initiative of the EEC to propose a basis for the solution and regulations for the problem of the presence of nitrosamines in children's products.

Consequently in order to be certain of satisfying the above legislation it is necessary to reduce these NA (and relative precursors) in crude rubber to the limit which is possible to detect by means of the best analytical techniques and avoid the use of additives which are capable of releasing them.

It is known that in the case of polymers produced by radicalic polymerization, these NA (and relative precursors) in crude rubber can be due to particular additives used together with particular shortstopping agents.

The field of radicalic emulsion polymerization is well-known in the art. The systems, used at present, date back to the 40s' and 50s'.

Without dwelling on the subject of radicalic polymerizations, but only for the purpose of making clear the terms of the present invention, we can say that, in emulsion polymerization processes, the monomer is emulsified in a medium such as water with the help of emulsifying agents such as soaps or synthetic surface-active agents. Initially the monomer is mainly present in the form of drops dispersed in the continuous aqueous phase, inside the micelies/particles and to a lesser extent in water.

In radicalic emulsion polymerization the chain reaction is initiated by radicals which can be generated either by the thermal decomposition of peroxides and diazo-compounds or by an redox reaction (redox couple).

Initiators commonly used for generating radicals by decomposition are potassium peroxydisulphate (KS208), benzoylperoxide and azobisisobutyronitrile, whereas diisopropylbenzene hydroperoxide and paramenthane hydroperoxide are oxidants for redox couples.

For example the combination of potassium peroxydisulphate with a mercaptan, such as dodecyl mercaptan, is used to polymerize butadiene and styrene (SBR) at 50° C. (hot polymerization); mercaptan has a double action: generating the radicals by reaction with the peroxydisulphate and regulating the molecular weight of the polymer by shortstopping a growing polymeric chain and then generating another one.

The polymerization is shortstopped at a conversion of 70–75% or even less as higher conversions produce polymers with lower physical properties, presumably owing to the cross-linking which forms microgels or highly branched structures.

An improvement in the production of SBR rubbers was obtained by the use of more active radicalic initiator systems (redox systems) which permitted polymerization even at 5° C. with high conversion rates (cold polymerization; L. H. Howland and coll. Industrial and Engineering Chemistry, vol. 45, no.6, 1953). The polymers obtained with cold polymerizations shortstopped at a 60% conversion have better properties than polymers obtained with hot polymerizations.

Redox systems consist of a reducing agent and an oxidizing agent. The transfer reaction of an electron generates a radical which initiates the polymerization reaction. The simplest system consists of hydrogen peroxide or organic peroxides as oxidizing agent and bivalent iron as reducing agent.

The ferrous ion can be used in many forms. Normally phosphates or ethylenediaminotetracetic acid (EDTA) are added which act both as buffers and complexing agents of the iron. In particular the complexing action helps to keep the solubility and consequently the reactivity of the iron constant. In many cold polymerization auxiliary reducing agents are also used (sulphoxylates) as components of a redox cycle, wherein the ferric ion is again reduced to ferrous ion. Reducing sugars are no longer widely used because of their cost and propensity to bacterial attack during storage.

Although this initiator system is mainly used for cold polymerizations, it can also be used for hot polymerizations.

To ensure the quality of the final polymer it is necessary to shortstop the reaction at a well-defined conversion. This is obtained by the addition of a small quantity of shortstopping agent capable of reacting rapidly with the radicals and oxidizing agents, thus destroying the residuous initiator and polymeric radicals and avoiding the formation of new radicals.

The non-reacted monomers are then removed: first the conjugated diene, for example the butadiene, by means of flashing first at atmospheric and then reduced pressure; then the styrene by stripping in a vapour flow in a column.

An antioxidizing emulsion is then added to protect the polymer. Finally the latex is possibly mixed with oil and coagulated by adding diluted acid, for example sulphuric acid and possibly a salt, for example aluminium sulphate, organic polyelectrolytes or sodium chloride.

The characteristics required for a shortstop are illustrated by D.C. Blackely (Emulsion Polymerization, Theory and Practice (1975).

The efficiency of the shortstopping agent depends among other things on the type of initiator used.

The shortstopping agent commonly used in hot polymerizations (based on peroxydisulphate as initiator) used to be hydroquinone which proved however to be ineffective in cold polymerizations (redox initiator system) and in any case was not capable of achieving a rapid and permanent shortstop.

Although dinitrochlorobenzene was used in cold polymerizations it has several disadvantages: it colours the rubber, is insoluble in water and is consequently toxic causing serious health problems to the plant personnel.

For this reason research was carried out on ingredients capable of also shortstopping cold polymerizations.

The shortstop agent for redox initiation systems, which was used on a wide scale for many years, consists of a combination of dithiocarbamates and sodium polysulphides mixed (U.S. Pat. No. 2,662,876) at times with sodium nitrite. This latter ingredient is considered useful for preventing the undesired and uncontrolled polymerization of non-converted monomers during the recovery of these from the reaction mixture. This so-called "wild polymerization" causes an increase in the molecular weight of the end-product and the production of an undesired cross-linked polymer which can lead to the dirtying of the distillation and flash equipment of the butadiene as described again by D.C. Blackley (Emulsion Polymerization, Theory and Practice (1975).

From U.S. Pat. No. 3,222,334 it results that N,N-dialkyl-hydroxylamines are excellent shortstops both for hot and cold polymerizations. They have the advantage of not colouring the rubber and not having negative effects on the vulcanized products.

The disadvantage of both dithiocarbamates and dialkyl-hydroxylamines is, as mentioned above, that they are precursors for the formation of nitrosamines. In fact dithiocarbamate and dialkyl-hydroxylamine in an acid environment produce secondary amines; the secondary amines then react with nitration agents, nitrogen oxides having the general formula NOx, present in the air and form nitrosamines.

The use of dithiocarbamate in the presence of sodium nitrite becomes even more critical as during the coagulation of the latex (acid conditions) the former decomposes by hydrolysis to dimethylamine; the latter, in turn, reacts with the sodium nitrite to give N-nitroso dimethylamine.

A solution to the formation of undesired nitrosamines is provided in U.S. Pat. Nos. 4,985,326 and 5,177,164. The former claims a process for deactivating the radicalic polymerizations by a dithiocarboxylic hydroxyaromatic acid which is a non-precursor of nitrosoamines (this compound however is very costly and not easily available on the market); the second also claims the production of polymers without nitrosoamines only using however sodium polysulphide as shortstop agent in high quantities (from 0.02 to 0.5 parts per 100 of monomers charged initially into the system).

The disadvantages of the use of sodium tetrasulphide alone is described in U.S. Pat. No. 3,575,912: these disadvantages mainly consist in the precipitation of sulphur consequently blocking the lines and corroding the equipment by the development of $H_2S$.

There was therefore the problem of finding a shortstopping agent for radicalic polymerization reactions, to be used in processes where rubber without nitrosamines and/or their precursors are required and which at the same time do not have the above disadvantages. More specifically there was the problem of finding an effective shortstopping agent which was considered to be without nitrosamines and precursors and which did not cause the blocking of the lines, corrosion of the equipment and reduced the development of hydrogen sulphide, which, as stated above, occurred in the known art (problems of environmental hygiene).

The problem has been excellently resolved by using as shortstopping agent a mixture of sodium polysulphide and isopropylamine acetate in suitable combinations and with the solution to be shortstopped; in this way, as will be shown below, rubbers without nitrosamines and their precursors are produced. This result was reached by studying the process for the production of polymers deriving from a conjugated diene, preferably 1,3-butadiene and possibly an aromatic vinyl-substitute, preferably styrene, in an aqueous emulsion polymerization process at a temperature of between −20° C. and 70° C., using hydroperoxide as initiator and a redox activator system, which comprises a bivalent transition metal, preferably iron in the form of a bivalent salt and, preferably, sulphate, a reducing agent and possibly a chelating agent.

The polymerization process carried out possibly in the presence of a modifying agent, produces polybutadiene or SBR rubbers without nitrosamines and/or their precursors and is characterized by the use, as shortstopping agent, of a mixture of isopropylhydroxylamine acetate $(CH_3)_2CHNH_2OH+CH_3COO$ in a quantity equal to 0.010–0.030 parts and sodium polysulphide in a quantity of 0.005–0.015 parts per 100 parts of monomer charged initially. As can be seen immediately by an expert in the field, the quantities of the two components of the mixture forming the shortstopping agent, are lower than those required by the use of each single component, thus justifying the existence of the synergetic effect of the two components with respect to the shortstopping reaction.

The use of the shortstopping agent of the present invention is particularly applicable in the production of homopolymers of conjugated dienes and in particular for 1,3-butadiene, isoprene, chloroprene or for mixtures of 1,3-butadiene with other conjugated dienes. It can also be used for the production of copolymers of said conjugated dienes with a vinyl-substituted aromatic, such as styrene, vinyl-naphthalene, 2,4-dichlorostyrene, p-methoxystyrene, p-methylstyrene, 3,3-dimethylstyrene, divinylbenzene, α-propyl-styrene, o-hydroxystyrene, o-methyl-α-methylstyrene or similar products of which styrene, either pure or possibly mixed with lesser quantities of one or more vinyl-substituted aromatic monomers, is the preferred monomet.

It is also possible to use the shortstopping couple of the present invention to shortstop copolymerization reactions of butadiene with acrylonitrile in the production of nitrile rubbers.

On the basis of what has been specified above, the aim of the present invention is a process for deactivating the radicalic polymerization of a dienic monomer either alone or mixed with other monomers which can undertake suspension or emulsion polymerizations at temperatures of between −20° C. and +70° C., using a hydroperoxide as initiator and a redox activator system comprising a bivalent transition metal, preferably iron, a reducing agent and possible a chelating agent, this process being characterized in that a mixture is used as shortstopping agent comprising:

a) from 0.010 to 0.03 parts by weight of isopropylhydroxylamine acetate per 100 parts of monomer/s initially charged into the polymerization reactor and, b) from 0.005 to 0.015 parts by weight of sodium polysulphide per 100 parts of monomer/s initially charged.

As already stated, the invention consists in the use, as an effective shortstopping agent, of a combination of sodium polysulphide and isopropylhydroxylamine acetate and this combination has a synergetic effect due to the fact that the quantities used in each reagent are lower than those required by the use of a single component.

The term sodium polysulphide is used to indicate a compound having the general formula $M_2S_x$, wherein M=Na, K and x is a value which varies from 1 to 7 with an average value of 4.

The isopropylhydroxylamine (IPHA) is used in the form of acetate salt to allow use in a liquid form.

Unlike dialkyl-hydroxylamines, IPHA does not lead to the formation of nitrosamines as is shown in the experimental part at the end of the text.

The use in the mixture of a reduced quantity of sodium polysulphide causes a decrease in corrosion and toxicity (by the development of hydrogen sulphide) and in the blocking of the lines owing to precipitation and crystallization. This can be deduced from the tests described at the end of the text which show that the quantity of hydrogen sulphide released is minimum and similar to that of the known art.

On the basis of the process of the present invention homopolymers or copolymers can be prepared with a wide variation of monomeric ratios.

The weight ratio of the conjugated diene, for example butadiene, with the vinyl-substituted aromatic, for example styrene and with acrylonitrile, preferably varies within a range of 90:10 to 50:50.

The aqueous emulsion polymerization process can be carried out at temperatures ranging from −20° C. to 70° C., more specifically as "cold polymerization" from −20° C. to 10° C., and as "hot polymerization", using temperatures from 40° C. to 70° C.

Suitable initiators which can be used are: paramentane hydroperoxide, cumene hydroperoxide, pinane hydroperoxide, diisopropyl toluene hydroperoxide, diisopropylbenzene hydroperoxide, p-tert.butyl cumene hydroperoxide, trimethylpentyl hydroperoxide, hydrogen peroxide, 1,1-diphenylethane hydroperoxide and similar products or mixtures of these of which paramentane hydroperoxide is preferred. These initiators are normally used in quantities which vary from 0.01 to 0.4 parts by weight per 100 parts by weight of monomers initially charged.

The hydroperoxides are combined with a mixture of ferrous compound/sulphoxylate/chelating agent which act as redox activator. A typical example consists of ferrous sulphate as iron compound, formaldehyde sodium sulphoxylate as sulphoxylate component and EDTA as chelating agent.

The activators generally consist of: ferrous sulphate 0.001–0.04 parts by weight; sulphoxylate 0.01–0.2 parts by weight; chelating agent 0.005–0.2 parts by weight per 100 parts of monomers initially charged.

Modifiers which can be used are alkyl sulphide xanthogenates, halogenforms and alkyl mercaptans containing from 8 to 16 carbon atoms in particular tert-dodecyl mercaptan. Other suitable modifiers can be selected from n-dodecyl mercaptan, t-hexadecyl mercaptan.

The modifier is normally used in a quantity which varies from 0.05 to 0.6 parts by weight per 100 parts by weight of monomers initially charged.

The emulsion generally preferred is the "oil in water" type, with the ratio aqueous medium/monomers varying from 0.5:1 to 5:1 and preferably from 1.5:1 to 2.75:1 in parts by weight.

The emulsifier generally used is soap from fatoleic and/or resinic acid, diterbutyl benzoic acid or a derivative of Versatic acid and among the polymerization products there may be contained small quantities of one or more electrolytes, such as trisodic phosphate or potassium chloride.

Generally a small quantity of disperser such as sodic salt of naphthalenesulphonic acid condensed with formic aldehyde may also be added. The pH may vary from 9 to 13 preferably from 10 to 11.

The polymerization may be carried out in batch, semicontinuous, and continuous. The total pressure of the reagents is at least equal to the total vapour pressure of the mixture so that the initial reagents will be present in the liquid phase.

After the desired conversion of monomers to polymer has been reached which normally varies from 55 to 90%, the polymerization is stopped by the addition of a shortstopping agent.

In order to efficiently prevent the further formation of polymers during the elimination of the non-reacted monomers, the shortstopping agent used according to the present invention is added in a quantity equal to 0.005–0.015 % by weight of sodium polysulphide and 0.01–0.03% by weight of isopropylhydroxylamine acetate with respect to the total monomer charged initially.

The process of the present invention provides rubber in which the formation of nitrosamines is avoided during production and subsequent operating phases. In addition, the use of reduced quantities of sodium polysulphide diminishes the risk of blocking the lines and the corrosion of the equipment.

The following examples illustrate the various aspects of the present invention. In these examples, the kinetics of the polymerization reaction were followed by percentage measurements of the latex. If the shortstop is efficient after its addition the solid percentage of latex remains constant. One of the criteria for determining the efficiency of the shortstop is to determine the variation of solid % in a latex together with the non-reacted monomers during a certain period of time at room temperature or, under more critical conditions, at 50° C. The shortstopper is considered efficient if the variation of solid % is not significant during the duration of the test. As well as the solid %, the Mooney viscosity is also measured.

EXAMPLE 1

Data are provided which prove the advantage of the use of the combination of isopropylhydroxylamine acetate (IPHA) and sodium polysulphide in terms of:

a) presence of Nitrosamines (NA) and Precursors (AN) in the rubber;

b) development of hydrogen sulphide;

c) corrosion of the carbon steel equipment.

a) The "Technische regel fuer gefahrstoffe (TRGS 552)" refers to the following 12 N-nitrosamines:

| | |
|---|---|
| N-Nitroso-dimethylamine | NDMA |
| N-Nitroso-methylethylamine | NMEA |
| N-Nitroso-diethylamine | NDEA |
| N-Nitroso-di-n-propylamine | NDPA |
| N-Nitroso-di-i-propylamine | |
| N-Nitroso-piperidine | NPIP |
| N-Nitroso-di-n-butylamine | NDBA |
| N-Nitroso-diethanolamine | |
| N-Nitroso-morpholine | NMOR |
| N-Nitroso-pyrrolidine | NPYR |
| N-Nitroso-methylphenylamine | NMPhA |
| N-Nitroso-ethylphenylamine | NEPhA |

The determination of the nitrosamines and their precursors was carried out according to the procedure described in BGesundh B1 27, 160 (1984).

The minimum quantity which can be detected with the TEA detector for the NA corresponds to 1 µg/Kg, for the AN to 2 µg/Kg.

Table 1 compares the content, (expressed in micrograms/kg), of nitrosamines and amines which can undergo nitration in samples of SBR rubber obtained using the traditional shortstopper sodium dimethyldithiocarbamate (SMTC) + PS, and the new combination IPHA + PS.

TABLE 1

| | | SMTC + PS | | IPHA + PS | |
|---|---|---|---|---|---|
| POLYMERS | NA Type | NA | AN | NA | AN |
| SBR 1500 | NDMA | 24 | 914 | <1 | <2 |
| | NDPA | 3 | 88 | <1 | <2 |
| | NDBA | 7 | 8 | <1 | <2 |
| SBR 1502 | NDMA | 9 | 1137 | <1 | <2 |
| | NMEA | 2 | 68 | <1 | <2 |
| SBR 1712 | NDMA | 5 | 10 | <1 | <2 |
| | NMEA | 2 | <2 | <1 | <2 |
| SBR 1721 | NDMA | 2 | 18 | <1 | <2 |

From the data it can be seen that the use of the new combination IPHA + PS reduces the content of NA and AN to below the detectability limit of the method.

b) Table 2 shows the data relating to the development of hydrogen sulphide ($H_2S$), determined according to the analytical method supplied by Supelco [column SupelpakS, 30"packed 18")×⅛" OD Teflon (FEP), Temp. Col.: isotherm 1 min. at 35° C., then 210° C. at 40° C./min, flow rate: He 30ml/min, $H_2$ 140 ml/min, air (1) 80 ml/min, air (2) 170 ml/min.

Detector: FPD 210° C., Injector 170° C., 5 ml gas in the gas phase of the non-reacted BDE after flash using the traditional shortstopper, SMTC + PS, PS alone and the new combination PS + IPHA.

TABLE 2

| SHORTSTOP | H2S (ppm) |
|---|---|
| 0.115 phm SMTC + 0.015 phm PS | 66 |
| 0.060 phm PS | 880 |
| 0.0225 phm IPHA + 0.015 phm PS | 32 |

With the same analytical method the hydrogen sulphide present in the gas phase at equilibrium with the liquid phase (ratio gas/liquid 20/5) of two different solutions, was measured:

1) PS 0.35 % by weight;

2) PS 0.35 % by weight + IPHA 0.69 % by weight.

The solutions were thermostat-regulated at 80° C. in vials rinsed with nitrogen.

From the results shown in Table 3 it is evident that there is a considerable development of hydrogen sulphide from solution 1 which greatly increases with the fall of the pH. This is practically absent in solution 2.

TABLE 3

| SAMPLES | pH | H2S (ppm v/v) |
|---|---|---|
| PS | 11.0 | 120 |
| PS | 10.5 | 220 |
| PS + IPHA | 11.0 | <1 |
| PS + IPHA | 10.5 | <1 | c) Table 4 shows the data relating to corrosion obtained from samples in carbon steel placed at the head of the pilot stripping column for the three different shortstoppers:

TABLE 4

| SHORTSTOP | mm/year |
|---|---|
| 0.115 phm SMTC + 0.015 phm PS | ≦0.02 |
| 0.060 phm PS | 1.143 |
| 0.0225 phm IPHA + 0.015 phm PS | <0.02 |

From the data shown in tables 2 and 4 it can be seen that the use of polysulphide alone, in a greater quantity with respect to its use in couple, causes an increase in the production of $H_2S$ (toxic substance) and corrosion.

EXAMPLE 2

An aqueous emulsion polymerization, prepared with a 50/50 mixture of soap from fatty acid/resinic acid (4.6 parts of 100 of monomers), of a styrene-butadiene copolymer in a ratio of 28/72, was carried out in a 5 litre autoclave.

The catalytic system used was:

ferrous sulphate 0.0225 phm; sodium sulphoxylate formaldehyde 0.05 phm; paramentane hydroperoxide 0.06 phm.

Ter-dodecyl mercaptan (0.22 phm) was used as modifier.

The polymerization was carried out at 10° C. up to a 75% conversion.

Different shortstopping agents were added to the reagent mixture.

The latex, together with the non-reacted monomers, was heated to 50° C.

Table 5 shows the solid % data recorded during the storage of the latex at 50° C.; the variation of the solid % over a period of time is a measurement of the catalyst activity and the results are therefore inversely proportional to the activity of the shortstopping agent:

TABLE 5

| | | | Hours after the addition of shortstopper | | | |
|---|---|---|---|---|---|---|
| | Shortstop | | 0 h | 2 h | 16 h | 24 h |
| A | 0.020 phm PS | solid % | 27.2 | — | 29.6 | — |
| B | 0.030 phm PS | solid % | 25.5 | 25.5 | 25.5 | 25.5 |
| C | 0.030 phm IPHA | solid % | 25.8 | — | 27.7 | 27.9 |
| D | 0.040 phm IPHA | solid % | 25.5 | — | 25.7 | 25.8 |
| E | 0.010 phm PS + | solid % | 25.7 | 25.8 | 25.9 | 25.9 |

TABLE 5-continued

| Shortstop | Hours after the addition of shortstopper | | | |
|---|---|---|---|---|
| | 0 h | 2 h | 16 h | 24 h |
| 0.015 phm IPHA | | | | |

The results of example 2 show that mixture E is effective as a shortstopping agent and that a quantity of PS is used which is lower than that necessary for shortstopping the reaction (case B).

EXAMPLE 3

Unlike example 2, the following test was carried out using latex of SBR 1500 produced in a continuous plant consisting of 15 reactors.

Samples of latex were removed from the last reactor and placed in hermetically closed containers containing different types of shortstops in different quantities.

The latex, together with the non-reacted monomers, was heated to 50° C.

Table 6 shows the solid % data recorded during the storage of the latex at 50° C.

The criteria for evaluating the efficiency of the shortstopping agent are the same as example 2.

TABLE 6

| | Shortstop | | Hours after the addition of shortstopper | | |
|---|---|---|---|---|---|
| | | | 0 h | 16 h | 24 h |
| A | 0.030 phm PS | solid % | 26.4 | 26.8 | 26.6 |
| B | 0.010 phm PS + 0.015 phm IPHA | | 26.5 | 26.1 | 25.6 |

As in example 2, the mixture of point B is efficient and requires a reduced quantity of PS.

EXAMPLE 4

As for example 3 latex produced in a continuous plant was used.

Unlike the previous example, SBR 1712 latex was used shortstopped at a lower conversion (60%) and therefore under more critical conditions.

The same procedure as example 3 was carried out.

Table 7 shows the solid % data recorded during the storage of the latex at 50° C.

As well as the solid % variation, the Mooney Viscosity was also determined.

TABLE 7

| | Shortstop | | Hours after the addition of shortstopper | | |
|---|---|---|---|---|---|
| | | | 0 h | 16 h | 24 h |
| A | 0.030 phm PS | solid % | 22.0 | 26.7 | 27.1 |
| | | Mooney Visc. | 117 | 135 | 143 |
| B | 0.020 phm IPHA | solid % | 22.1 | 26.7 | 26.6 |
| | | Mooney Visc. | 116 | 149 | 152 |
| C | 0.040 phm PS | solid % | 21.2 | 21.3 | 21.3 |

TABLE 7-continued

| | Shortstop | | Hours after the addition of shortstopper | | |
|---|---|---|---|---|---|
| | | | 0 h | 16 h | 24 h |
| | | Mooney Visc. | 117 | 119 | 117 |
| D | 0.015 phm PS + 0.0225 phm IPHA | solid % | 23.1 | 23.5 | 23.5 |
| | | Mooney Visc. | 117 | 118 | 115 |

The new shortstopping agent (D) proves to be efficient and requires a reduced quantity of PS.

We claim:

1. Process for deactivating the radicalic polymerization of a dienic monomor either alone or mixed with other monomers susceptible to radicalic suspension or emulsion polymerization at temperatures of between −20° C. and +70° C., using a hydroperoxide as initiator and redox activator system comprising a bivalent transition metal, preferably iron, a reducing agent and possibly a chelating agent, this process being characterized in that a mixture is used as shortstopping agent comprising:
   a) from 0.010 to 0.03 parts by weight of isopropylhydroxylamine acetate per 100 parts of monomer/s initially charged into the polymerization reactor and,
   b) from 0.005 to 0.015 parts by weight of sodium polysulphide per 100 parts of monomer/s initially charged.

2. Process for deactivating the radicalic polymerization according to claim 1, characterized in that the dienic monomer used is:
   1,3-butadiene, isoprene, chloroprene or mixtures of 1,3-butadiene with at least one of the other two conjugated dienes.

3. Process for deactivating the radicalic polymerization according to claim 1, characterized in that, monomers susceptible to radicalic polymerization are:
   styrene, vinyl naphthalene, 2,4-dichlorostyrene, p-methoxystyrene, p-methylstyrene, 3,3-dimethylstyrene, divinylbenzene, α-propylstyrene, o-hydroxystyrene, o-methyl-α-methylstyrene or mixtures of styrene with at least one of the other monomers.

4. Process for deactivating the radicalic polymerization according to claim 1, characterized in that acrylonitrile is used as monomer susceptible to radicalic polymerization.

5. Process for deactivating the radicalic polymerization according to claim 1, characterized in that initiators which can be used are: paramentane hydroperoxide, cumene hydroperoxide, pinane hydroperoxide, diisopropyl toluene hydroperoxide, diisopropylbenzene hydroperoxide, p-tert-.butyl cumene hydroperoxide, trimethylpentyl hydroperoxide, hydrogen peroxide, 1,1-diphenylethane hydroperoxide.

6. Process for deactivating the radicalic polymerization according to claim 1, characterized in that the bivalent iron is introduced into the polymerzation system in the form of ferrous sulphate.

7. Process for deactivating the radicalic polymerization of claim 1, characterized in that, a compound is used as sodium polysulphide having general formula $M_2S_x$, wherein M=Na and x is a value which varies from 1 to 7 with an average value of 4.

* * * * *